United States Patent [19]

Vansteelant

[11] Patent Number: 4,995,216
[45] Date of Patent: Feb. 26, 1991

[54] BALE WRAPPING CONTROL APPARATUS FOR ROUND BALERS

[75] Inventor: Marc G. Vansteelant, Zedelgem, Belgium

[73] Assignee: Ford New Holland, Inc., New Holland, Pa.

[21] Appl. No.: 361,063

[22] Filed: Jun. 5, 1989

[30] Foreign Application Priority Data

Jun. 14, 1988 [GB] United Kingdom ............... 88140868

[51] Int. Cl.[5] .................. B65B 11/04; B65B 41/12
[52] U.S. Cl. .................................. 53/64; 53/118; 53/587; 53/389
[58] Field of Search ............. 53/118, 587, 64, 211, 53/389

[56] References Cited

U.S. PATENT DOCUMENTS

| | | | |
|---|---|---|---|
| 4,563,854 | 1/1986 | Ackerman | 53/118 |
| 4,604,855 | 8/1986 | Krone et al. | 53/587 |
| 4,779,526 | 10/1980 | Frerich | 53/118 X |
| 4,896,477 | 1/1990 | Wagstaff | 53/118 |

FOREIGN PATENT DOCUMENTS

3418681 11/1985 Fed. Rep. of Germany .

*Primary Examiner*—John Sipos
*Attorney, Agent, or Firm*—Darrell F. Marquette; Frank A. Seemar; Larry W. Miller

[57] ABSTRACT

A round baler includes a bale chamber in which, in use of the baler, a bale of crop material is formed; a source of bale wrapping material; bale wrapping control apparatus; and a knife operable under the control of the wrapping control means to cut the wrapping material. The bale wrapping control apparatus comprises a first set of worm and sector gears operable to drive the knife to a position ready for cutting the bale wrapping material and a second set of worm and sector gears operable to determine the length of wrapping material to be dispensed from the source of wrapping material for wrapping a given bale and then to initiate operation of the knife to effect cutting of the dispensed wrapping means from the source. Both of the worm gears are carried on a single master shaft which is rocked in one direction to activate the first set of gears and in the opposite direction to activate the second set of gears.

19 Claims, 5 Drawing Sheets

BALE WRAPPING CONTROL APPARATUS FOR ROUND BALERS

BACKGROUND OF THE INVENTION

This invention relates to so-called "round balers" which are balers operable to produce cylindrical or "round" rolls or bales of crop material. More particularly, the invention is concerned with apparatus for controlling the wrapping of a round bale with wrapping material.

When round balers first were introduced in the agricultural market, they were equipped with wrapping devices operable to wrap a completed bale with twine such as has been used for many years to wrap the traditional square or rectangular bale of crop material. Subsequently, round bales were wrapped with sheet material and more recently, with relatively large mesh netting. The use of sheet material or netting brought about the introduction of relatively sophisticated control mechanisms for the bale wrapping operation in order to control comparatively accurately the length of wrapping material dispensed for each bale so as to minimise the use and expense thereof. These sophisticated control mechanisms have to a great extent involved electronic and/or electro-mechanical arrangements with a relatively high initial cost and causing problems as regards maintenance in the field.

Less sophisticated mechanical systems have accordingly been proposed to overcome the above problems but these have proved unsatisfactory for other reasons. For example, U.S. Pat. No. 4,604,855 discloses wrapping apparatus for a round baler in which the bale wrapping operation is initiated by pulling on a lever with a rope or wire, the resulting pivotal movement of the lever serving both to raise cutter means and to initiate drive to a feed mechanism for the wrapping material. At the same time a mechanism for "timing" the feeding of wrapping material, and hence the length thereof dispensed, is primed. The disadvantages of this arrangement are that the cutter means has to be raised manually, requiring considerable force because of the inevitably heavyweight nature thereof to ensure cutting of the wrapping material on release, and that a certain force is also required to maintain engagement between a pair of friction rolls, one of which drives one of a pair of feed rolls for the wrapping material. The operator only releases his pull on the rope or wire when the wrapping material reaches the bale chamber in which the completed bale to be wrapped is rotating, whereupon the dispensing of the wrapping material from a source roll is taken over solely by the rotating bale, the friction drive ceasing on release of the wire or rope. The primed "timing" mechanism is then activated and operates to release the cutter means when the mechanism times out, whereby the wrapping material is cut and continued rotation of the bale takes up the remainder of the cut length. Thus with this arrangement, the satisfactory actuation of the wrapping apparatus is very dependent on the pull exerted by the baler operator on the wire or rope and the ability of the operator to judge when the wrapping material is in the correct position relative to the bale to be wrapped. Accordingly, the likelihood of mis-wrapping is unacceptably high.

In German Patent No. 3,418,681 there is disclosed a generally similar wrapping apparatus in that the pulling on a rope or wire by the operator raises or pivots cutter means ready for the subsequent cutting action and engages a drive mechanism which "times" the wrapping operation. Although in this arrangement the operator does not have to maintain the pull on the wire or rope to ensure that the feed mechanism for the wrapping material is actuated and then watch for when the wrapping material is in position for being taken up by the rotating bale to be wrapped, the arrangement still suffers from the disadvantage that heavy cutter means has to be raised manually.

In both of the known arrangements described above, the cutter means is primed for cutting on initiation of the wrapping sequence, whereby the cutter means are in the normal rest position which is not the case in the arrangement of European Application No. 0.239.761 in which the cutter means are primed as a wrapped bale is discharged from the baler and remain so until released at the end of the wrapping sequence. Thus the cutter means is not primed manually but the arrangement suffers from the disadvantage that the cutter means can be released inadvertently during normal operation of the baler or during baler maintenance which is highly undesirable.

SUMMARY OF THE INVENTION

The object of the present invention is to provide a round baler having bale wrapping apparatus which is relatively simple, but which does not suffer from the disadvantages of known apparatus.

According to the present invention there is provided a round baler having a bale chamber in which, in use of the baler, a bale of crop material is formed, a source of bale wrapping material, bale wrapping control apparatus, and cutter means operable under the control of the wrapping control means to cut the wrapping material. The bale wrapping control apparatus comprises first drive means operable to drive the cutter means to a position ready for cutting the bale wrapping material, second drive means operable to determine the length of wrapping material to be dispensed from the source of wrapping material for wrapping a given bale and then initiate operation of the cutter means to effect cutting of the dispensed wrapping means from the source thereof, and single control means operable to control both the first and second drive means.

The single control means may be in the form of a master shaft provided with portions of the first and second drive means. Preferably, the master shaft is mounted for rocking movement, whereby the first and second drive means are activated in operation of the bale wrapping apparatus. In a preferred arrangement, the first drive means is activated on rocking movement of the master shaft in one direction, with the second drive means being activated on rocking movement of the master shaft in the opposite direction. A spherical bearing may be used to mount the master shaft for rocking movement with drive to the shaft being imparted through a bevel gear which can accommodate that rocking movement.

The first drive means may comprise a worm gear provided on the master shaft and a sector gear cooperable with the worm gear and being mounted on one of a pair of pivotal arms between which is carried the cutter means, whereby the cutter means are lifted to the position ready for cutting the bale wrapping material when the first drive means is activated. The second drive means may also comprise a further worm gear provided on the master shaft and being cooperable with a furthersector gear pivotally mounted on the frame of the baler. It is desirable to prevent any bouncing movement of the cutter means either as it effects its cutting operation or during normal operation of the baler. To this end, releasable latch means may be provided to latch the cutter means in the normal rest position thereof.

A pair of pinch rolls may be employed to feed bale wrapping material from the source thereof and drive to the pinch rolls may be initiated as the cutter means are moved to the position ready for cutting the bale wrapping material. In the arrangement in which the cutter means is carried by the pair of arms, an idler pulley may be mounted on one of these arms so as to be movable therewith to tension a belt drive to one of the pinch rolls.

The sector gear of the second drive means may be arranged to rest against one end of the associated worm gear on the master shaft so as not to be in mesh therewith and being arranged to fall to a position ready for meshing with that worm gear when the master shaft is rocked in the direction to activate the first drive means. An adjustable stop may be provided in order to limit the pivotal movement of the sector gear of the second drive means which determines the extent of driving of the second drive means and thus the amount of bale wrapping material dispensed from the source thereof to wrap a completed bale within the bale chamber. The adjustable stop provides simple means by which the baler operator can adjust the amount of bale wrapping material to be dispensed, and thus the number of turns of the bale wrapping material on the bale to be wrapped. The sector gear of the second drive means may carry a nontoothed sector or other member which acts as a stop in cooperation with the cutter means so that the latter are not rendered operative until such time as that stop disengages the cutter means, which disengagement takes place once the second drive means is deactivated.

The initiation of the bale wrapping apparatus may be by way of an over-centre device which can be operated manually by the baler operator or electro-mechanically, or in any other desired manner. Once the over-centre device has been operated, the arrangement is preferably such that it is automatically returned to its normal rest position at the completion of a bale wrapping operation. In the arrangement employing the master shaft, the over-centre device is used merely to effect rocking movement in the direction to activate the first driving means and this requires a comparatively small force and when the device has gone over-centre, it maintains activation of the first driving means so that the operator does not have to make any input to this and subsequent operation of the bale wrapping apparatus which is an advance over known arrangements.

According to another aspect of the present invention, the source of bale wrapping material selectively dispenses wrapping material into the bale chamber of a round baler so that a finished bale therein can be wrapped with wrapping material; and the cutter means includes a cutting edge for severing the wrapping material after a sufficient amount thereof has been fed into the bale chamber. The cutter means is movable between a retracted, inoperative position and a cutting position. A braking means is operably connected with both the source of bale wrapping material and the cutter means in a manner such that the source of bale wrapping material is restrained against further dispensing when the cutter means is moved from the inoperative position to the cutting position.

The braking means may comprise a connecting rod positively linking the cutting means with one of a pair of truncated tube elements also forming part of the braking means. Rotational movement of the truncated tube elements relative to each other and caused by the knife falling to its cutting position may urge net roll support means on either side of the net roll towards one another for immobilizing the netroll at the same instant that the net is cut. Due thereto, an undesired and uncontrolled unwinding of wrapping material is prevented from occuring after a wrapping cycle has been finished.

DESCRIPTION OF THE DRAWINGS

A baler in accordance with the present invention will now be described in greater detail, by way of example, with reference to the accompanying drawings, in which.

DESCRIPTION OF THE PREFERRED EMBODIMENT

Figure 1:
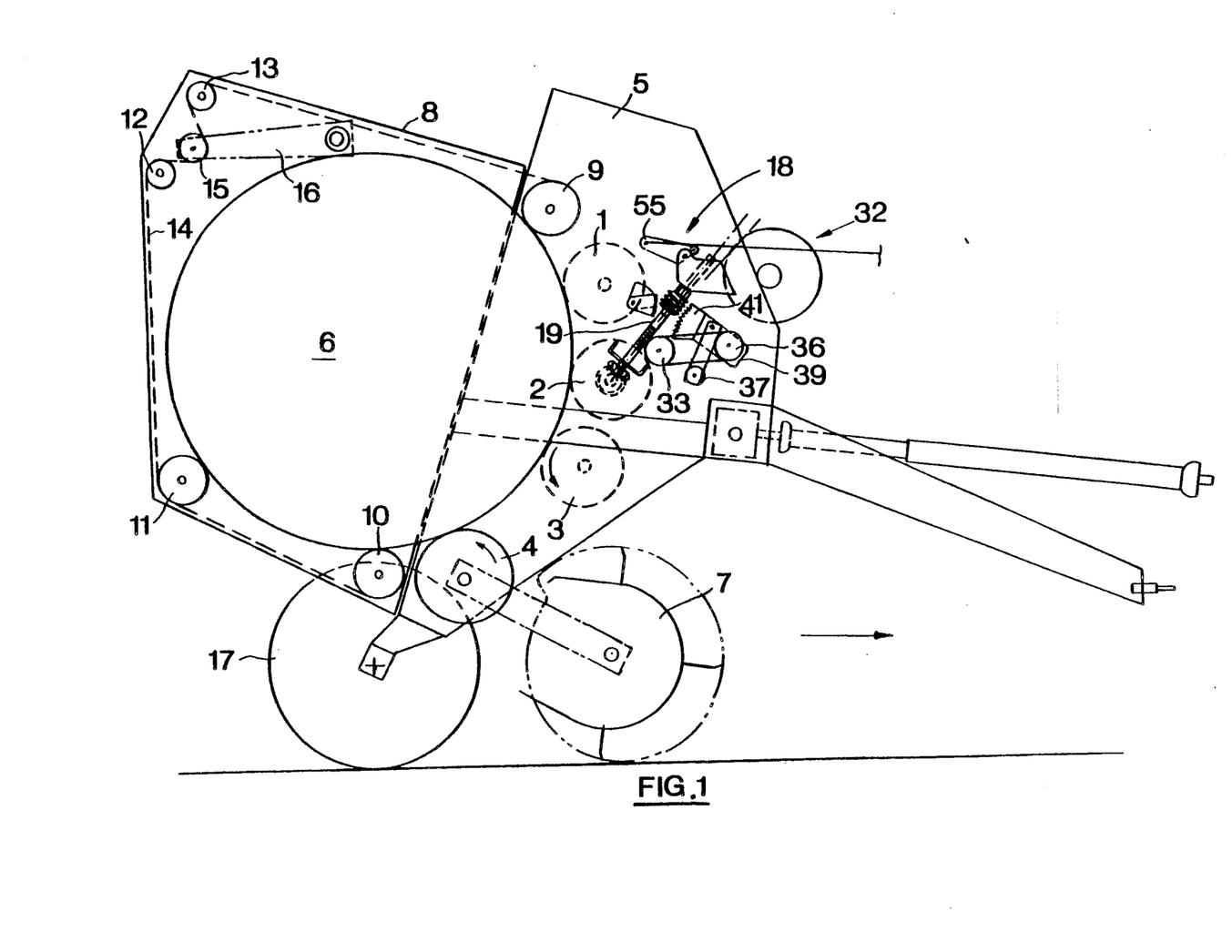
FIG. 1 is a somewhat diagrammatic side view of the baler.

Looking first at FIG. 1 of the drawings, the round baler is of the form having a plurality of rolls 1, 2, 3 and 4 defining a majority of the periphery of a front portion 5 of a bale chamber 6. The roll 4 is that which supports the bale during formation and is one of the two rolls 3 and 4 which define the throat of the bale chamber 6 into which crop material is fed by a conventional crop pick-up device 7. The second or rear portion 8 of the bale chamber 6 is movable relative to the front portion 5 to allow bale discharge and is of the expandable type. The rear portion 8 of the bale chamber 6 comprises fixed rolls 9, 10 and 11, and idler rolls 12 and 13 around all of which rolls individual belts 14 are wrapped, only one belt 14 being seen in FIG. 1. A movable roller 15 is provided between the ends of a pair of pivotal arms 16 in order to take up the slack in the belts 14 when a bale is first being formed. The baler is fitted with a pair of ground-engaging wheels 17.

The basic operation of the baler so far described is that the pick-up device 7 delivers crop material to the throat between the rolls 3 and 4 which deliver the crop material into the bale chamber 6, whereupon the core of the bale begins to form with the arms 16 at this stage being in the position (not shown) in which slack in the belts 14 is taken up. As the core of the bale grows with the further infeed of crop material from the pick-up device 7, the rear portion of the bale chamber 6 begins to expand with the rolls 1-4 and the belts 14 serving to rotate the bale as it is being formed. The bale eventually reaches full size when the belts 14 are in the position showing FIG. 1 and it is at this stage that it is required to wrap the completed bale with wrapping material under the control of wrapping control apparatus indicated generally at 18 and shown in greater details in FIGS. 2 to 4.

Figure 2:
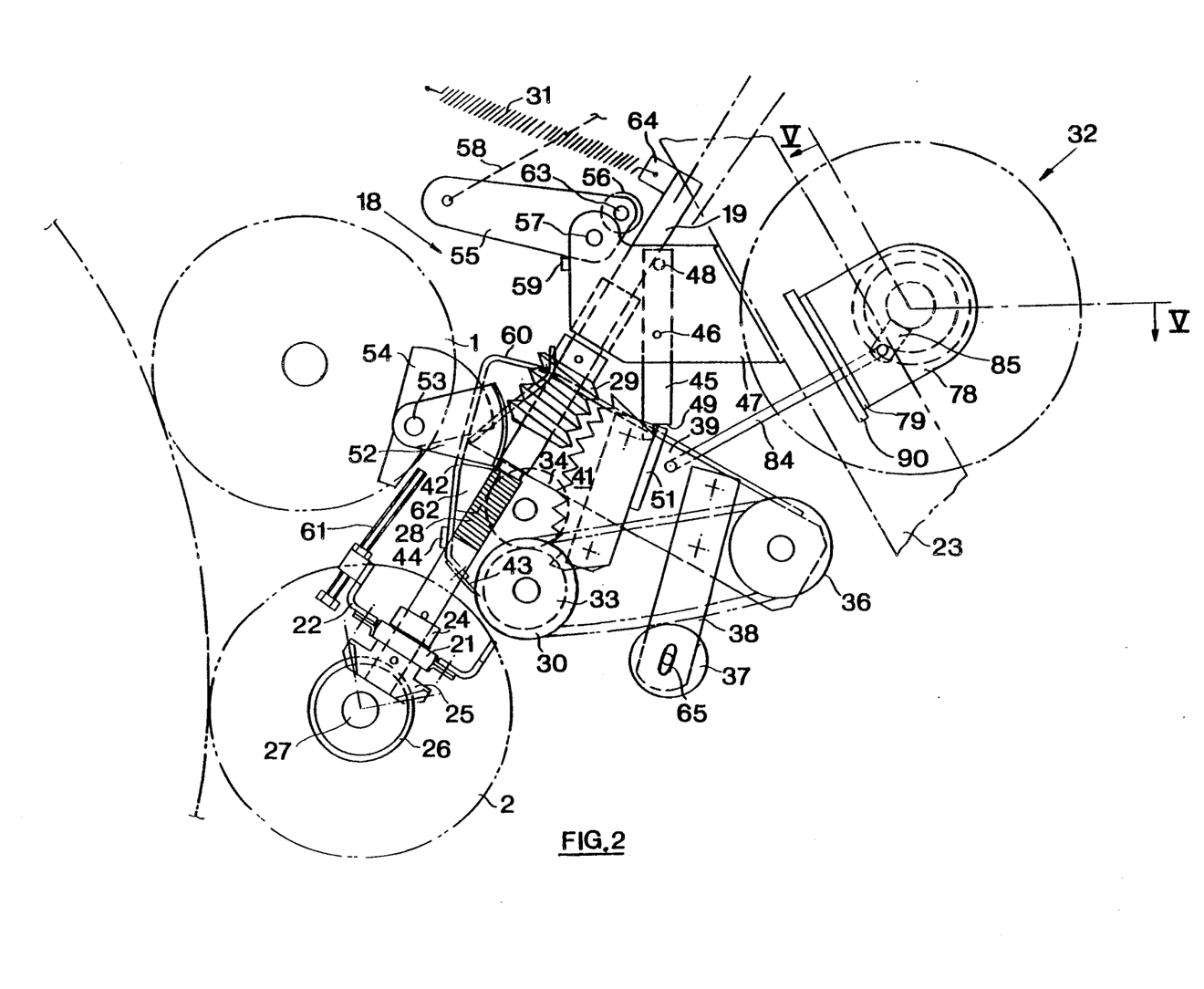
FIGS. 2, 3 and 4 are enlarged partial views of FIG. 1 showing bale wrapping apparatus of the baler in the rest position and different stages of operation, respectively.
Figure 3:
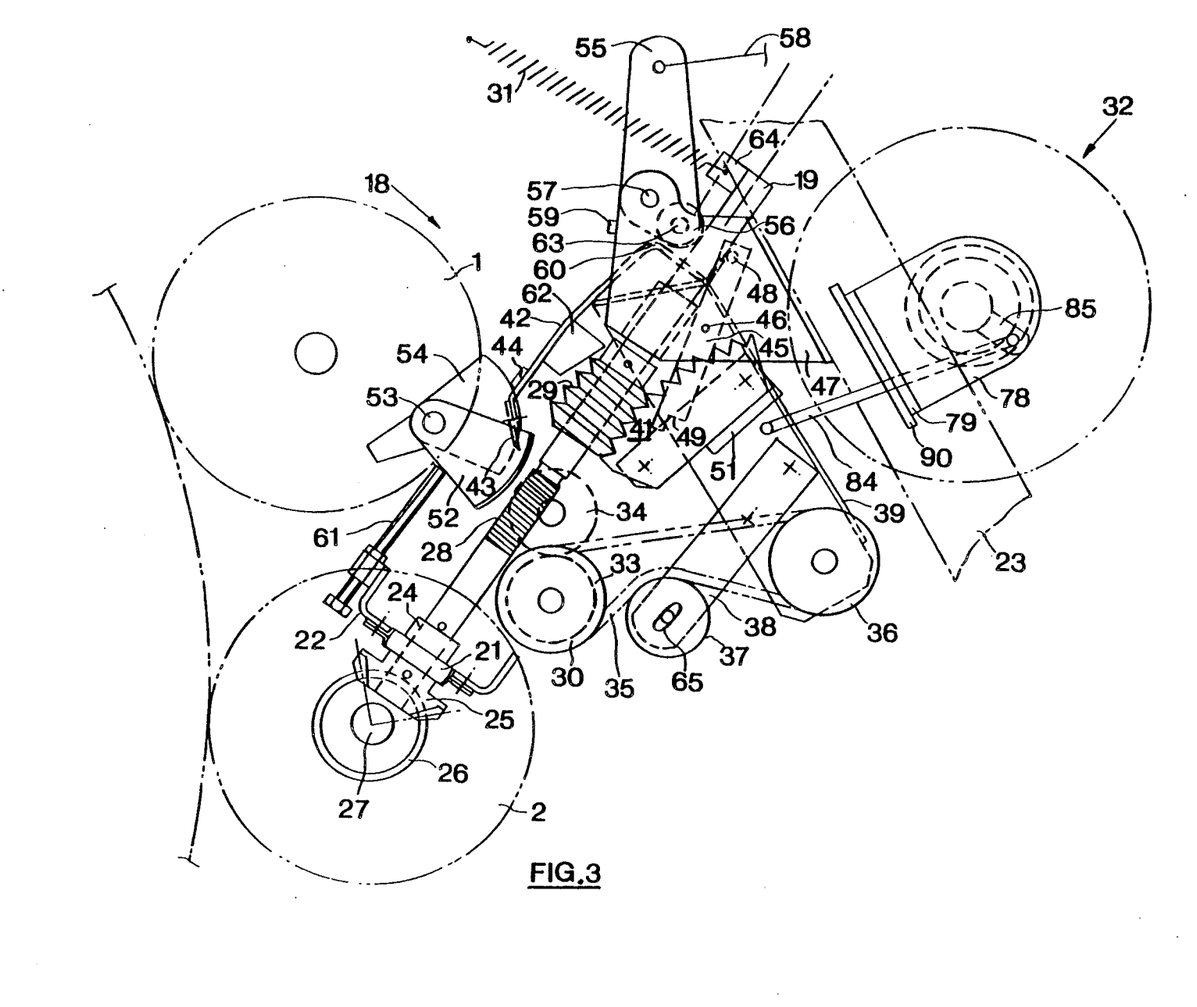
Figure 4:
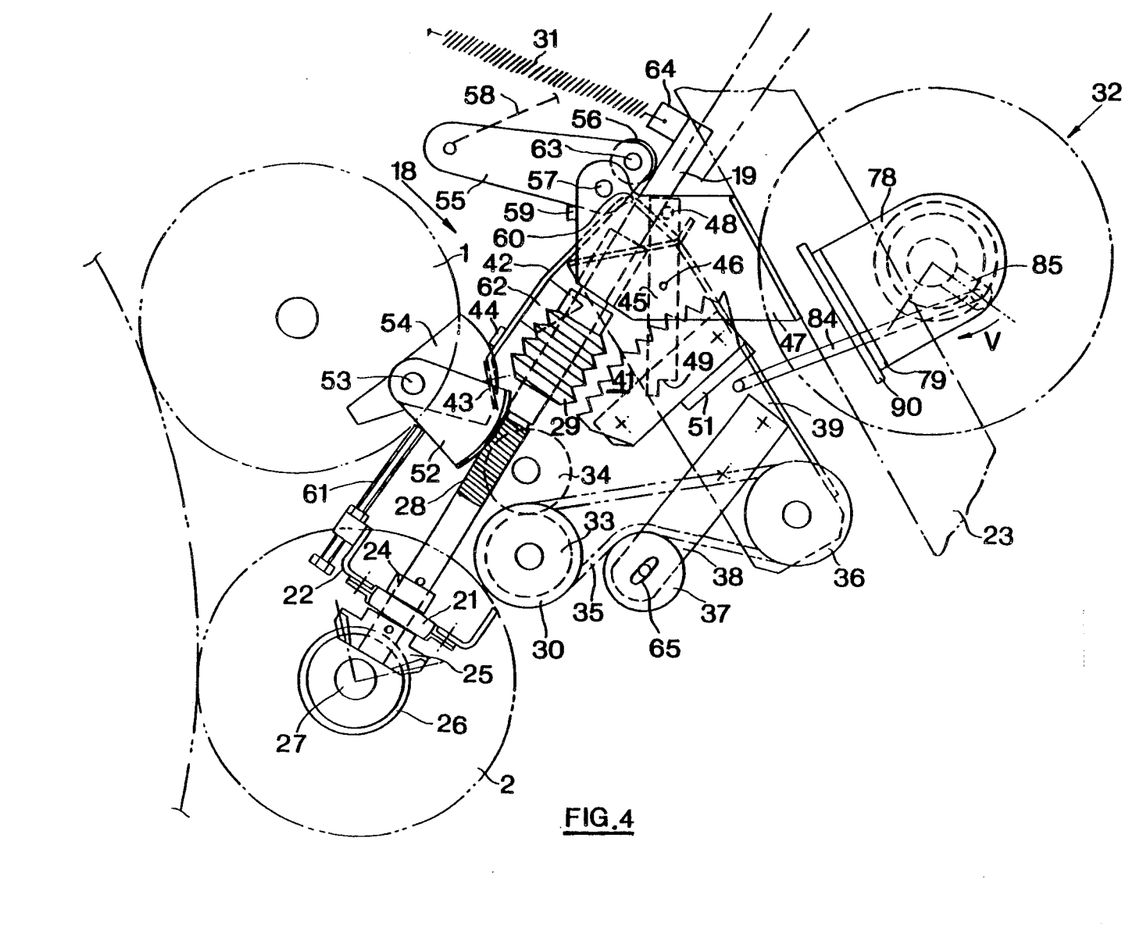

Turning then to FIGS. 2-4, these show an enlargement of a portion of FIG. 1, as already mentioned, and depict different positions of the bale wrapping apparatus 18. The bale wrapping control apparatus 18 comprises a master shaft 19 mounted for rocking movement in a spherical bearing 21 supported by a bracket 22 attached to a frame 23 of the baler of which only part is shown in FIGS. 2 to 4. The shaft 19 is provided with a collar 24 at one side of the bearing 21 and has attached to one end, on the opposite side of the bearing, a bevel gear 25 which is constantly in mesh with a further bevel gear 26 provided on one end of the shaft 27 of the roll 2. As the roll 2 is driven continuously in use of the baler, then so is the shaft 19. The shaft 19 is provided with two worm gears 28 and 29 and the upper end of the shaft is provided with a lug 64 which receives one end of a spring 31, the other end of which is attached to the frame 23 of the baler. This spring 31 serves to urge the shaft 19 to the rest position of FIG. 2, this position being that adopted by the shaft throughout the formation of a bale. The source of wrapping material 32 in the form of netting or sheet material is in the illustrated embodiment by way of a roll of netting 91 supported for rotation on the frame 23. Net is taken from the roll 91 and passed through a pair of pinch rolls 33 and 34, the roll 33 of which is drivable by a belt 35 which wraps round a pulley 30 provided at one end of the roll 33 and a drive pulley 36 mounted on the frame 23. This drive pulley 36 is continuously driven throughout the operation of the baler but because an idler pulley 37 does not tension the belt 35 in the bale forming mode of the machine, then the pinch roll 33 is not driven.

It will be seen that the idler pulley 37 is mounted at the end of an arm 38 to which is fixedly attached a first one of a pair of further arms 39 which pivot about the drive axis of the drive pulley 36. The first arm 39 carries a toothed drive sector 41 and the two arms 39 carry between them a knive support arm 42, a knife 43 being provided at the end of that arm and being in the form of a serrated blade. The knife support arm 42 carries a stop member 44 for a purpose to be described. The first arm 39, and hence the knife support arm 42 and the knife 43 being rigidly connected thereto, is positively retained in the rest position of FIG. 2 by a latch or stop arm 45 pivotally attached at 46 to an arm or projection 47 attached to the frame 23 of the machine. The other end of the arm 45 carries a pin 48. The operative end of the arm 45 is stepped at 49 and this step engages a stop plate 51 attached to the first arm 39.

Pivotally attached to the frame 23 of the baler is a further toothed drive sector 52 pivotally mounted about an axis 53 and having associated with it a non-toothed sector 54. In the bale forming mode of the machine, the toothed sector 52 rests against the shaft 19 at the uppermost end of the worm 28 but the teeth on the sector are not allowed to mesh with the worm 28 and thus the sector is retained in the position shown in FIG. 2 of the drawings. In effect, the edge of the sector 52 merely rests on the top thread of the worm 28 so that meshing is prevented. Also pivotally attached at 57 to the arm 47 secured to the frame 23 of the baler is an arm 55 which carries a roller 56. The end of the arm 55 opposite to that to which the roller 56 is attached has connected to it a wire or rope 58 which extends to the cab of the tractor, or other pulling machine, for operation by the operator. It should be noted that the actuation of the arm 55 may be by way of an electro-mechanical or other device, it only being necessary to move the arm 55 to initiate net wrapping of a completed bale, no great or prolonged force being involved.

It will be seen that, in the rest position of the wrapping control apparatus, the roller 56 is positioned close to, but not in engagement with, the shaft 19 and a stop member 59 is provided on the associated arm 47 to restrain the arm 55 from pivoting anticlockwise other than by a predetermined amount. The roller 56 has an extended pivot shaft 63 which is engageable by the end 60 of the knife arm. An adjustable stop 61 is provided on the bracket 22 in order to limit the clockwise movement of the toothed sector 52 and hence the non-toothed sector 54. This adjustable stop 61 serves to determine the duration of the net wrapping operation and hence the length of net which is supplied to a completed bale. Thus the operator can adjust the stop 61 in order to vary the wrapping of a bale as between, for example, one and a half turns of net to perhaps two or more turns, according to requirements.

Once a bale has been completed within the bale chamber 6, as previously described, the operator pulls on the wire or rope 58 and hence pivots the arm 55 about the pivot axis 57 and thus engages the roller 56 with the shaft 19 which is thus rocked in its spherical bearing 21 in a clockwise direction, as seen in FIG. 2, and this movement pivots the arm 45 by virtue of the shaft 19 pushing on the pin 48, whereby the stop 49 is removed from the associated arm 39 which is thus free to pivot about the axis of the drive pulley 36. Further rocking movement, in the same direction, of the shaft 19 engages the worm 29 with the toothed sector 41 and because the shaft 19 is continuously rotating, then the sector 41 is driven in a clockwise direction and thus the arms 39 are driven in the same direction and serve to raise the knife arm 42 and knife 43. In as much as the shaft 19 has now been rocked to its maximum right position, as illustrated in FIG. 3, this allows the toothed sector 52, and hence the non-toothed sector 54, to drop in a clockwise direction through an arc the extent of which is determined by the adjustable stop 61 as seen in FIG. 3 of the drawings. It should be noted that at this point the teeth of the sector 52 are still not in mesh with the worm 28. It should also be noted that the arm 55 has gone over centre to the position of FIG. 3, whereby it is automatically retained so that there is no further operator involvement in the bale wrapping operation.

As the arms 39 are driven clockwise, the idler pulley 37 is brought into engagement with the belt 35 which is thus gradually put under tension and eventually imparts drive to the pinch roll 33 from the drive pulley 36 this driving of the pinch roll 33, and hence the pinch roll 34, feeds net from the roll 32 between the rolls 1 and 2 to the bale chamber 6 where it is caught between the completed bale to be wrapped and the rolls 2, 3 and 4, and subsequently the belts 14 and roll 1, and thus taken around the periphery of the bale to wrap the same.

As the arms 39 continue to be driven by the worm 29 via the sector 41, the end 60 of the knife arm 42 engages the axial extension on the roller 56 and thus pushes the arm 55 back over centre to its original and rest position of FIG. 2. This reversion of the arm 55 to its original position is depicted in FIG. 4 of the drawings and it will be seen that the shaft 19 has now returned to its original and rest position under the action of the spring 31. By this movement, the teeth on the sector 52 now mesh with the worm 28, bearing in mind that this sector is still, at this stage, in the position shown in FIG. 3. Thus the sector 52 is now driven anti-clockwise and carries with it the non-toothed sector 54. When the knife arm 42 is in the raised position of FIG. 3 and the nontoothed sector 54 is in the dropped position of the same Figure, the stop member 44 thereon engages the non-toothed sector 54 and is thus prevented from falling down to its initial position. As the sectors 52 and 54 are driven in an anticlockwise direction by the worm 28, there comes a point when the sector 54 no longer provides a cooperating stop for the stop member 44 on the knife arm 42, whereupon the knife arm 42 and knife 43 fall under gravity. Bearing in mind that at this time the net is extending under tension from the supply roll 32 to the bale being wrapped, and bearing in mind the considerable weight of the knife arm 42 and the knife 43 which extend the full width of the bale chamber 6, then the fall of the knife serves to sever the net in a quick and precise operation. As the arms 39 return to their initial position, as a result of the drop of the knife arm 42 and knife 43, then the idler pulley 37 is disengaged from the belt 35 and hence the drive to the pinch roll 33 is interrupted so that no more net is fed from the supply roll 32, the free end of the net being retained in the nip of the pinch rolls 33, 34 ready for the next bale wrapping operation. The knife arm 42 carries two resilient pads 62 which, when the knife 43 and hence the knife arm 42 fall to their initial position (FIG. 2), engage the pinch roller 34 in order to ensure that this is arrested immediately and cannot serve to feed any more net once cutting of the net has been effected.

Following one embodiment of the present invention a free-wheeling device is fitted to the pinch roll 33 so that if the pull on the net, once the latter has been taken up by the bale, is such that the speed of the pinch roll is to be increased, then the pinch roll free wheels so as not to affect the normal drive thereto. In another embodiment the circumferential speed of the pinch roll 33 is approximately synchronised with the linear speed of the net passing through the pinch rolls 33, 34 once the net positively has been gripped by the rotating bale. However, it should be noted that the circumferential speed of the pinch roll 33 imposed by the drive pulley 36 may never exceed the linear speed of the net being pulled in by the bale. Otherwise, the pinch rollers 33, 34 would deliver the net faster to the bale than the bale actually can take it up, what in the end would result in a malfunctioning of the wrapping apparatus 18. Taking account thereof and as it is rather difficult to accurately synchronise both speeds, a somewhat lower drive speed of the pinch roll 33 has been made possible by providing the following additional feature. A slot 65 provided in the arm 38 connected to the first arm 39 enables adjustment of the idler pulley 37 in such a manner as to varry the tension applied to the belt 35 while drive is being transmitted to the pinch roll 33 as seen in FIG. 3. In case the belt 35 is not fully tensioned but only slightly, however enough to impart drive to the low power consuming roll 33, then slippage is made possible between the pulley 30 provided on the roll 33 and the belt 35. Indeed, during the wrapping operation, the net at first is pulled through the pinch rolls 33, 34 at a speed dependent from the drive coming from the drive pulley 36. Once the net is positively taken in by the faster rotating bale, then drive is also imparted through the net to the pinch rolls 33, 34. The pinch roll 33 which accordingly is driven from two different sides at two different speeds, adopts the speed of the fastest driver. As a result, slippage occurs between the pulley 30 connected to the pinch roll 33 and the belt 35, causing no harm however as the latter is only slightly tensioned.

It should further be noted that the knife 43 remains in the down position until such time as it is required for the next net-cutting operation. This is a safety feature so that there can be no danger of the knife falling during the normal bale-forming operation or machine maintenance, for example. Furthermore, the latch arm 45 serves to lock the first arm 39, and hence the knife 43, in the down or rest position of FIG. 2 and this is an important feature because the knife can only be in the raised position or in the lower position and nothing in between. The importance of this is that if the knife 43 were not positively retained in the down position, then it could bounce and this can sometimes detract from the effective cutting of the net and/or result in noise during normal baler operation. The latch arm 45 is spring loaded so as always to urge it to the latching position, i.e. the position of FIG. 2 of the drawings.

The extent of the rocking movement of the master shaft 19 during the bale-wrapping mode of the baler is relatively small, of the order of 1° to 3° and such movement is readily accommodated by the spherical bearing 21 and the bevel gears 25 and 26.

Figure 5:
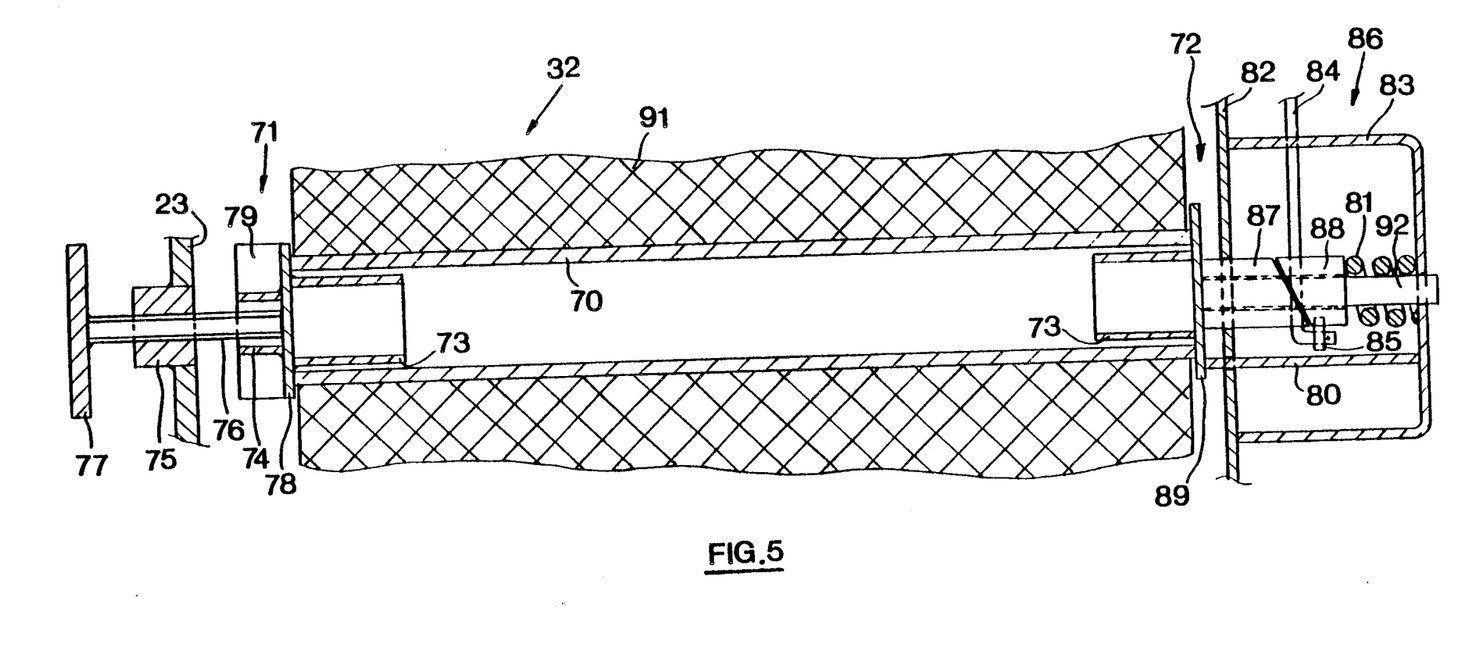
FIG. 5 is a sectional view taken along the lines V—V of FIG. 2.

Referring now to FIG. 5, the source of bale wrapping material 32 is shown in more details, consisting of the roll of netting material 91 typically provided with a hollow cardboard core 70. Roll supporting elements 71 and 72 mounted on the frame 23 at respective ends of the roll 91 freely rotatably carry the same for permitting unwinding of net during the wrapping operation. The roll supporting element 71 comprises a base plate 78 to the opposite sides of which hubs 73 and 74 are fixedly attached. The base plate 78 equally comprises a perpendicularly extending flange 79 which is supported on a fixed extension 90 of the frame 23 as best can be seen in FIG. 2. A handle 77 is rigidly secured to one end of a threaded rod 76 which itself is adjustably received by a nut 75, welded to the baler frame 23, while the opposite end of the rod 76 is slidingly received by the hub 74 of the roll supporting element 71. The roll supporting element 72 at the other side of the net roll 91 equally comprises a base plate 89 to one side of which a hub 73 is secured, while the other side is provided with a shaft 92 for partially supporting the element 72 on a frame extension 83. It will be appreciated that the outer diameter of the hubs 72 of both supports 71, 72 is less than the inner diameter of the core 70 for enabling easy mounting of a net roll 91 and removal of an empty core 70.

With this arangement, an unrestrained rotation of the net roll 91 relative to the fixed supports 71, 72 can be achieved, which is desirable during the wrapping cycle, but which may cause problems inbetween successive wrapping cycles. Unrestrained unwinding of the net roll thus should be prevented inbetween sucessive wrapping cycles. Indeed, as explained above, the pinch roll 34 is engaged by resilient pads 62 for immediately arresting the rolls 33, 34 when the knife 43 falls to its cutting position, thereby preventing that any more net is fed to the bale once the wrapping operation has been finished. Independently therefrom and due to the inertia forces of the relatively heavy net roll 91, the latter still can freely rotate after the net has been cut, at the same time supplying net to the arrested rolls 33, 34. It will be readily appreciated that this is highly undesirable since the uncontrolled unwinding of net will lead to a pile-up of loose net between the pinch rolls 33, 34 and the supply of netting material 32, which could cause an irregular feeding of net in the next wrapping operation. For preventing this, a braking means 86 is provided on the source of wrapping material 32 comprising a connecting rod 84, one end of which is pivotally attached to the second one of the pair of arms 39 to which the knife support arm 42 is secured. The other end of the rod 84 is also pivotally connected to an extension 85 of a truncated tube element 88, the sloping side of which cooperates with a similarly shaped tube element 87, which itself is fixedly secured to the base plate 89 of the roll supporting element 72 and slidingly received in a frame plate 82. Both tube elements 87, 88 are coaxially centered with respect to the shaft 92 which further also carries a spring 81 provided between the frame extension 83 and the one side of the truncated tube element 88 for a purpose to be described hereafter.

When a roll of wrapping material 91 is installed on the machine, the handle 77 is adjusted so that, when the braking mechanism 86 is in its inoperative position, the roll 91 is freely rotatable on the supporting elements 71, 72. This condition, of course, is required during the wrapping cycle. However, at the completion of a wrapping cycle when the net is cut by means of the falling knife 43, the connecting rod 84 is pulled, causing a rotation of the truncated tube element 88 in the direction of arrow V in FIG. 4. As rotational movement of the adjacent tube element 87 is prevented by a positioning member 80 extending through an aperture in a frame plate 82, the slope of both elements 87, 88 will force the latter to the right as seen in FIG. 5 against the increasing force of the spring 81 when the falling knife 44 causes a rotation of said truncated tube element 88. The spring 81 eventually may be fully compressed so that a substantial clamping force in the axial direction is exerted on the cooperating truncated tube element 87. This force is transmitted through the roll supporting element 72 and the core 70 to the adjacent fixed roll support 71, thereby pinching the net roll 91 in between both supports 71, 72 for obtaining an instant braking and arresting of the net supply roll 91 at the same time as the net is cut. This braking force is relieved only during the next wrapping cycle when the knife 43 is raised again to its inoperative position. As such, due care is taken to ensure that no net can be dispensed in between two successive bale wrapping cycles.

When an empty core 70 should be replaced by new roll of wrapping material, the handle 77 is rotated for unscrewing the rod 76 out of the hub 74 of the roll support 71. Once the rod 76 is totally cleared from the support 71, the empty core 70 can be removed giving way for a new roll of net 91 to be installed in a reverse order to the one as just described. For preventing an undesired restrain of the net roll 91 during a normal wrapping operation, the positioning pin 80, to which reference already has been made, is secured to the base plate 89 for providing a stop-element for the roll support 72. Indeed, after a new roll 91 is installed, the handle 77 is rotated for urging the roll support element 71 to the right hand side as seen in FIG. 5. Consequently, also the net roll 91 and the support 72 are urged to the right, the displacement thereof however being limited by the positioning pin 80 contacting the adjacent wall of the frame extension 83. At this stage, and by employing a pin 80 with an appropriate length, no compression force will be exerted on the spring 81 and the adjacent truncated elements 87, 88. As soon as the positioning pin 80 contacts the frame 83, one turn of the handle 77 in the opposite direction will suffice for ensuring a freely rotable mounting of the net roll 91 on the respective supports 71, 72.

It will be seen that the bale wrapping apparatus of the present invention is relatively simple and that the bale-wrapping operation is automatic once initiated by the operator by pulling on the rope or wire 58 to pivot the arm 55 over centre, this operation requiring only a minimal force. Even so, this initiation of the bale wrapping apparatus can be effected other than manually, for example, by electro-mechanical means. Thus one aspect of the present invention affords an advance in the art over prior balers which either have relative expensive, electronically-controlled bale wrapping apparatus, or more economic mechanical apparatus which suffers from the disadvantages discussed above.

It also will be seen that a baler in accordance with the second aspect of the present invention does not suffer from inertia forces experienced by the rotating net roll 32 which tend to further deliver net even after the net has been cut. By arresting the net roll 32 at the same time as the net is cut, the same is kept tensioned between the pinch rollers 33, 34 and the net roll 32, which ensures a smooth feeding of net for the next bale to be wrapped. It will be appreciated that a mechanism for arresting the pinch rolls 33, 34 eventually may be omitted as the function thereof can be taken over by the braking mechanism 86 on the net roll 91.

What is claimed is:

1. In a round baler having a bale chamber in which cylindrical bales of crop material are formed, a source of bale wrapping material, bale wrapping control means, and cutter means for cutting the wrapping material, said bale wrapping control means comprising:
    first drive means operable to drive the cutter means to a position ready for cutting the bale wrapping material;
    second drive means operable to determine the length of wrapping material dispensed from the source of wrapping material for wrapping a cylindrical bale and then to initiate operation of the cutter means to effect cutting of the wrapping material dispensed from the source thereof; and
    single control means including a driven master shaft rotatable about its longitudinal axis and mounted for rocking movement in opposite directions about a point on its longitudinal axis in order to alternately control the operation of the first and second drive means.

2. In a baler according to claim 1, wherein the first drive means is activated on rocking movement of the master shaft in one direction, and in that the second drive means is activated on rocking movement of the master shaft in the opposite direction.

3. In a baler according to claim 2, wherein the master shaft is mounted for rocking movement in a spherical bearing and is rotatably driven through bevel gears which can accommodate rocking movement of the master shaft.

4. In a baler according to claim 2, wherein the master shaft is continuously rotatably driven in operation of the baler.

5. In a baler according to claim 4, wherein the master shaft is rotatably driven from a roll of a plurality of rolls forming part of a portion of the bale chamber.

6. In a baler according to claim 5, wherein the first drive means comprises a first worm gear provided on the master shaft and a first sector gear cooperable with the first worm gear, the first sector gear being mounted on one of a pair of first pivotal arms between which is carried the cutter means, the cutter means being lifted to the position ready for cutting the bale wrapping material when the first drive means is activated.

7. In a baler according to claim 6, wherein releasable latch means is provided operable to latch one of the first arms, and hence the cutter means in the rest position.

8. In a baler according to claim 7, wherein the latch means is released by the master shaft as that shaft is rocked in the direction to activate the first drive means.

9. In a baler according to claim 8, wherein the bale wrapping control apparatus further comprises a pair of pinch rolls operable to feed wrapping material from the source of wrapping material to the bale chamber, one of the feed rolls being driven from a drive train which is rendered operative following activation of the first drive means.

10. In a baler according to claim 9, wherein the drive train comprises a driving pulley, a driven pulley mounted on said one pinch roll, a drive belt interconnecting the driving and driven pulleys, and an idler pulley carried by one of the pair of arms, whereby the idler pulley is moved so as to tension the drive belt and hence impart drive to the pinch roll as the arms are pivoted on activation of the first drive means.

11. In a baler according to claim 10, wherein the second drive means comprises a second worm gear provided on the master shaft and a second sector gear cooperable with the second worm gear, the second sector gear being pivotally mounted on a frame of the baler.

12. In a baler according to claim 11, wherein the second sector gear is arranged so that one end thereof rests on one end of the second worm gear in the normal position of the master shaft, so as to be out of mesh with the second worm gear, and further arranged to pivot downwardly when the master shaft is rocked in the direction to activate the first drive means so as to be primed for meshing with the second worm gear when the master shaft is rocked in the opposite direction.

13. In a baler according to claim 12, wherein an adjustable stop is provided to determine the extent of pivotal movement of the second sector gear and hence the extent of driving of the second drive means.

14. In a baler according to claim 13, wherein the second sector gear carries a member which is cooperable with a stop member on the cutter means when the latter has been driven to the position ready for cutting so as to prevent the cutter means being rendered operative until deactivation of the second drive means occurs.

15. In a baler according to claim 1, wherein the rocking movement of the master shaft in a direction to activate the first drive means is effected via an over-centre device.

16. In a baler according to claim 15, wherein the over-centre device is actuated manually operable by the baler operator and is deactuated automatically as the cutter means reaches the position ready for cutting.

17. In a baler according to claim 15, wherein the over-centre device is actuated electro-mechanically and is deactuated automatically as the cutter means reaches the position ready for cutting.

18. In a baler according to claim 9 wherein means are provided for arresting one of the pinch rolls once the cutter means has been rendered operative to cut the wrapping material to ensure that no further wrapping material is dispensed from the source thereof once cutting has been effected.

19. In a round baler according to claim 1 wherein:
said source of bale wrapping material selectively dispenses wrapping material into the bale chamber so that a finished bale therein can be wrapped with wrapping material;
said cutter means includes a cutting edge for severing the wrapping material after a sufficient amount thereof has been fed into the bale chamber; said cutter means being movable between a retracted, inoperative position and a cutting position; and
braking means is operably connected with both the source of bale wrapping material and the cutter means so that the source of bale wrapping material is restrained against further dispensing when the cutter means is moved from the inoperative position to the cutting position.

* * * * *